(12) United States Patent
Pfanner et al.

(10) Patent No.: US 9,799,871 B2
(45) Date of Patent: Oct. 24, 2017

(54) REINFORCED BATTERY SEPARATOR

(75) Inventors: Thom Pfanner, Grafton, WI (US);
William J. Ross, Mukwonago, WI (US); David Mendoza, Glendale, WI (US); Frank-Thomas Johns, Hannover (DE); Jerome R. Heiman, Campbellsport, WI (US); Michael E. La Croix, Mequon, WI (US); Carlos M. Aguilar, Monterrey (NL); Maumi Tsurumaki, Sorocaba (BR)

(73) Assignee: Johnson Controls Technology Company, Milwaukee, WI (US)

( * ) Notice: Subject to any disclaimer, the term of this patent is extended or adjusted under 35 U.S.C. 154(b) by 402 days.

(21) Appl. No.: 13/003,517

(22) PCT Filed: Jul. 10, 2009

(86) PCT No.: PCT/US2009/050278
§ 371 (c)(1),
(2), (4) Date: Mar. 23, 2011

(87) PCT Pub. No.: WO2010/011507
PCT Pub. Date: Jan. 28, 2010

(65) Prior Publication Data
US 2011/0177375 A1    Jul. 21, 2011

Related U.S. Application Data

(60) Provisional application No. 61/079,612, filed on Jul. 10, 2008.

(51) Int. Cl.
*H01M 2/18* (2006.01)
*H01M 2/14* (2006.01)
(Continued)

(52) U.S. Cl.
CPC ............. *H01M 2/18* (2013.01); *H01M 2/145* (2013.01); *H01M 10/12* (2013.01); *H01M 10/14* (2013.01); *Y02T 10/7016* (2013.01)

(58) Field of Classification Search
CPC ........ H01M 2/18; H01M 2/145; H01M 10/12; H01M 10/14
(Continued)

(56) References Cited

U.S. PATENT DOCUMENTS 6,641,954 B2    11/2003  Weerts et al.
2003/0129486 A1*  7/2003  Bohnstedt et al. ........... 429/143
(Continued)

FOREIGN PATENT DOCUMENTS

DE    10 2006 014691 B3    8/2007
JP         02 160365 A       6/1990
(Continued)

OTHER PUBLICATIONS

International Search Report and Written Opinion from the International Searching Authority, dated Dec. 21, 2009, received in connection with PCT/US09/050278, 9 pages.

*Primary Examiner* — Nicholas P D'Aniello
(74) *Attorney, Agent, or Firm* — Boardman & Clark LLP (57) ABSTRACT

Separators for use in batteries are disclosed. In various embodiments, the separators include one or more of raised shoulders, ribs in three or more sizes, thickened mini-ribs on shoulders, and ribs within the shoulder. The disclosed separators are more resistant to failure due to punctures or tears than conventional separators.

13 Claims, 8 Drawing Sheets

(51) Int. Cl.
*H01M 10/12* (2006.01)
*H01M 10/14* (2006.01)

(58) Field of Classification Search
USPC .......................................................... 429/146
See application file for complete search history.

(56) References Cited

U.S. PATENT DOCUMENTS

2003/0186126 A1   10/2003  Weerts et al.
2007/0128511 A1    6/2007  Bohnstedt
2009/0068554 A1*  3/2009  Johns ...................... H01M 2/14
                                                                         429/129

FOREIGN PATENT DOCUMENTS

JP           05 002369 U    1/1993
JP          2003 109572 A   4/2003
WO    WO 2005/015661 A   2/2005
WO    WO 2007/110065 A1  10/2007

\* cited by examiner

REINFORCED BATTERY SEPARATOR

PRIORITY

This application claims priority to U.S. Provisional application 61/079,612 filed Jul. 10, 2008 and International Application PCT/US09/050278 filed Jul. 10, 2009, both of which are incorporated herein by reference in their entireties.

BACKGROUND

1. Field

The present application relates to the field of batteries (e.g., lead-acid batteries including batteries for vehicle starting, lighting, and ignition applications; marine batteries; commercial batteries; industrial batteries; batteries for use with hybrid-electric vehicles, microhybrid vehicles, etc.). The present application relates to battery separators. More particularly, it relates to a separator of varying thickness with areas of increased thickness near shoulders of the separator.

2. Related Art

It is known to provide electrical power storage devices, such as batteries or cells, for use in vehicles such as automobiles. For example, lead-acid batteries have been used in starting, lighting, and ignition applications ("SLI").

It is known to make a battery separator with raised ribs (to help prevent pressure short circuits) on an otherwise flat backweb. The ribs are generally evenly spaced across the width of the separator. However, such known separators do not realize certain advantageous features (and/or combination of features).

SUMMARY

An exemplary embodiment relates to a battery separator including a backweb of separator material having a backweb thickness, at least one major rib projecting beyond the backweb thickness a first distance, and at least one sub-major rib projecting beyond the backweb thickness a second distance wherein the first distance is greater than the second distance and wherein the ribs are approximately evenly spaced.

Another exemplary embodiment also relates to a battery separator including a backweb of separator material with a plurality of approximately evenly spaced ribs, a shoulder with shoulder mini-rubs, and a sub-major rib on each shoulder.

Another exemplary embodiment relates to a battery including at least one anode, at least one cathode, and at least one separator wherein the separator includes a backweb of separator material with major ribs and sub-major ribs and wherein the ribs are approximately evenly spaced.

Another exemplary embodiment relates to a battery including at least one anode, at least one cathode, and at least one separator wherein the separator includes a backweb of separator material with a plurality of approximately evenly spaced ribs, a shoulder with shoulder mini-rubs, and a sub-major rib on each shoulder.

Another exemplary embodiment relates to a method of manufacturing battery separators of different sizes comprising: forming a backweb of separator material with an odd number of ribs including a center rib wherein the separator is symmetrical about the center rib and the spacing of ribs to either side of the center rib is the same for all separators regardless of separator size.

These and other features and advantages of various embodiments of systems and methods according to this invention are described in, or are apparent from, the following detailed description of various exemplary embodiments of various devices, structures, and/or methods according to this invention.

BRIEF DESCRIPTION OF THE DRAWINGS

Various exemplary embodiments of the systems and methods according to the present disclosure will be described in detail, with reference to the following figures, wherein.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION OF THE PREFERRED EMBODIMENTS

Figures 1, 2:
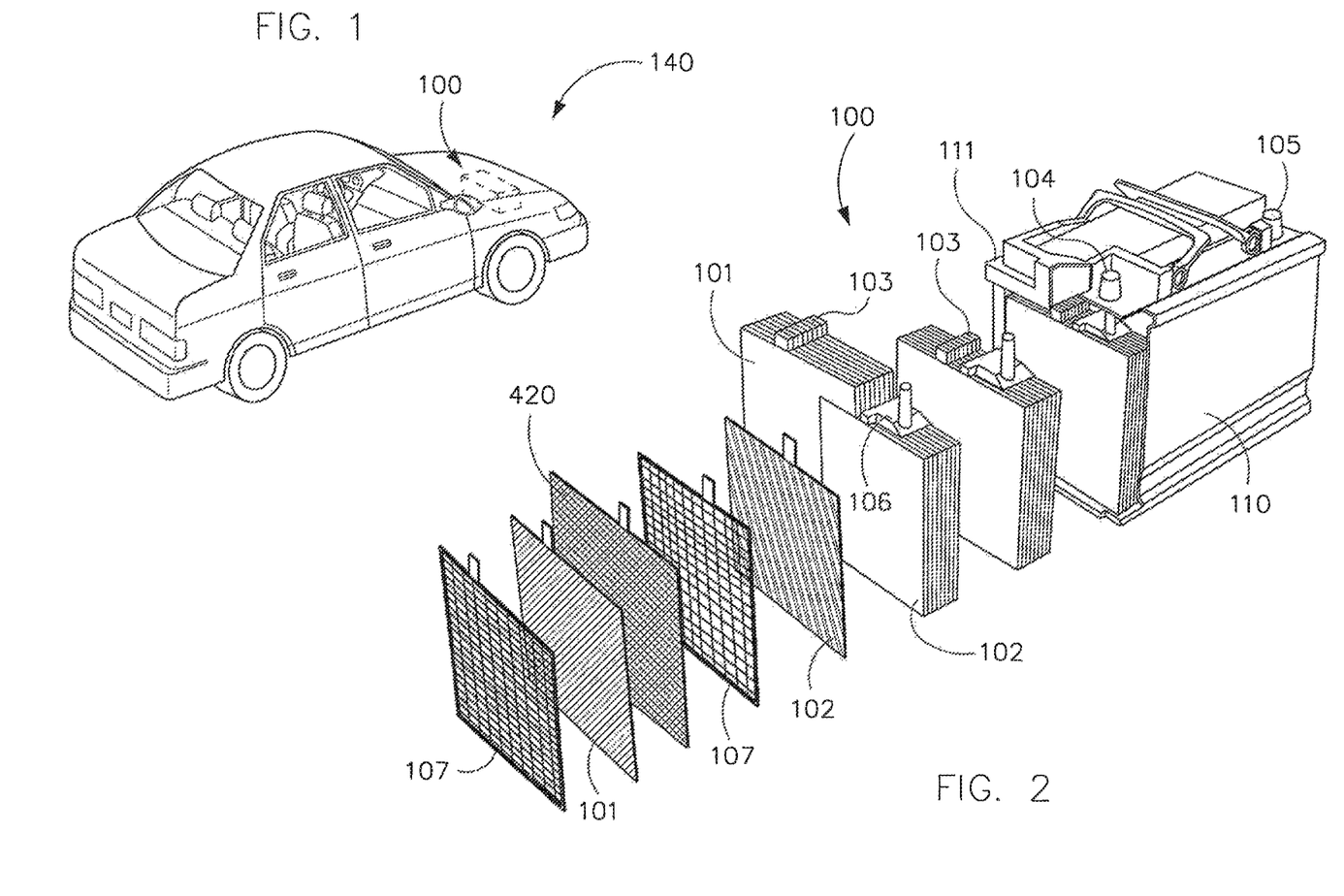
FIG. 1 is an isometric view of a vehicle including a battery according to an exemplary embodiment.
FIG. 2 is an isometric cut-away view of a portion of a battery and its components according to an exemplary embodiment.

Referring to FIG. 1, a vehicle 140 is shown that includes a battery 100 according to an exemplary embodiment. While vehicle 140 is shown as an automobile, according to various alternative embodiments, vehicle 140 may include any variety of types of vehicles including, among others, motorcycles, buses, recreational vehicles, boats, and the like. According to an exemplary embodiment, vehicle 140 uses an internal combustion engine for locomotive purposes.

Battery 100 shown in FIG. 1 is configured to provide at least a portion of the power required to start or operate the vehicle and/or various vehicle systems (e.g., starting, lighting, and ignition systems). Further, it should be understood that battery 100 may be utilized in a variety of applications not involving a vehicle, and all such applications are intended to be within the scope of the present disclosure.

The battery shown in FIG. 1 may include any type of secondary battery (e.g., rechargeable battery). According to an exemplary embodiment, battery 100 is a lead-acid storage battery. Various embodiments of lead-acid storage batteries may be sealed (e.g., non-maintenance) or unsealed (e.g., wet).

Battery 100, according to an exemplary embodiment, is illustrated in FIG. 2. In various embodiments, battery 100 includes several cell elements which are provided in separate compartments of a container or housing 110 containing electrolyte. The illustrations provided herein relate to automotive applications, wherein groups of 12-16 plates are used in each of six stacks for producing a standard automotive 12-volt battery. It will be apparent to those skilled in the art after reading this specification that the size and number of the individual plates, the size and number of plates in any particular stack, and the number of stacks used to construct the battery may vary widely depending upon the desired end use.

In various embodiments, housing 110 includes a box-like base or container and may be made of a moldable resin. A plurality of plate blocks are connected in series according to the capacity of the lead storage battery and are accommodated in the battery container or housing 110 together with the electrolyte, which is commonly aqueous sulfuric, acid.

In various embodiments, the battery includes a compartment having a front wall, end walls, a rear wall, and a bottom wall. In various embodiments, five cell partitions or dividers are provided between the end walls, resulting in the formation of six compartments, as typically would be present in a twelve volt automotive battery. In various embodiments, a plate block is located in each compartment, each plate block including one or more positive plates 101 and negative plates 102, each having at least one lug 103, and separator 420 placed between each positive plate 101 and negative plate 102.

Cover 111 is provided for the housing 110 and, in various embodiments, cover ill includes terminal bushings and fill tubes to allow electrolyte to be added to the cells and to permit servicing. To prevent undesirable spillage of electrolyte from the fill tubes, and to permit exhausting of gases generated during the electrochemical reaction, a battery may also include one or more filler hole caps and/or vent cap assemblies.

At least one positive terminal post 104 and at least one negative terminal post 105 may be found on or about the top or front compartments of battery 100. Such terminal posts 104 and 105 typically include portions which may extend through the cover and/or the front of the battery housing 110, depending upon the battery design. In various embodiments, the terminal posts also extend through a terminal post seal assembly to help prevent leakage of acid. It will be recognized that a variety of terminal arrangements are possible, including top, side, or corner configurations known in the art.

FIG. 2 also shows a conventional cast-on strap 106 which includes a rectangular, elongated body portion of a length sufficient to electrically couple each lug 103 in a plate set and an upwardly extending member having a rounded top. FIG. 2 also illustrates a cast-on-strap 106 coupling lugs 103 to a negative terminal 105. As shown in FIG. 2, according to various embodiments, the strap 106 includes a body portion coupling the respective lugs 103 in the end compartments and a post formed therewith that may protrude through a cover.

Each cell element or chapter includes at least one positive plate 101, at least one negative plate 102, and a separator 420 positioned between each positive plate 101 and negative plate 102. Separators 420 are provided between the plates 101 and 102 to prevent shorting and undesirable electron flow produced during the reaction occurring in the battery 100.

Figure 3:
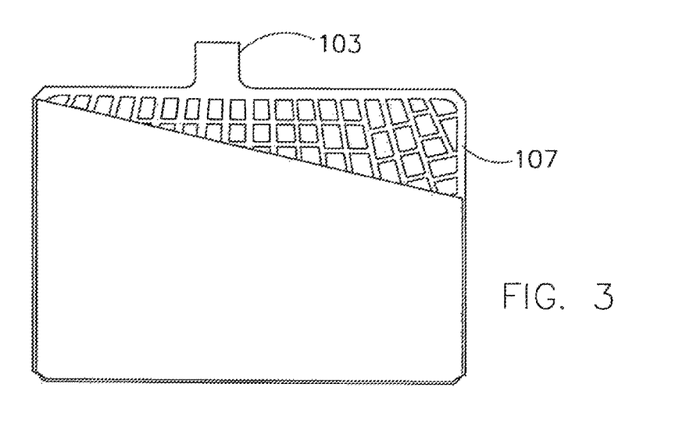
FIG. 3 is a front plan cut-away view of a battery plate or electrode (e.g., positive battery plate) including a stamped grid and active material according to an exemplary embodiment.
Figure 4:
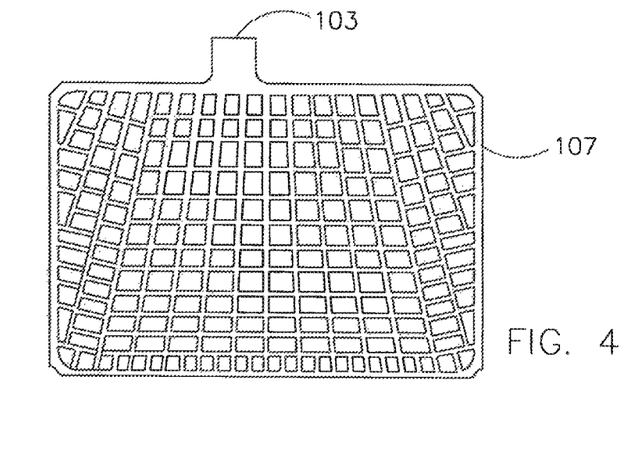
FIG. 4 is a front plan view of a stamped grid (e.g., positive grid) according to an exemplary embodiment.
Figure 5:
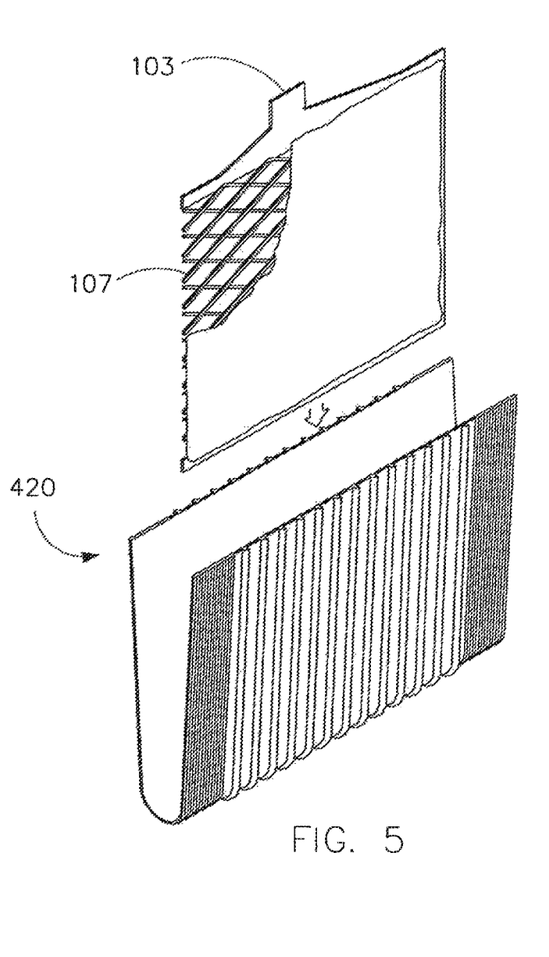
FIG. 5 is an isometric exploded view of a battery plate or electrode (e.g., negative battery plate) and separator according to an exemplary embodiment.

Positive electrode plates 101 and negative electrode plates 102 can be classified into various types according to the method of manufacturing the same. As one example, a paste type electrode is shown in FIGS. 3-5. In various embodiments, the paste type electrode includes a grid 107 substrate and an electrochemically active material or "paste" provided on the substrate. The grid 107 may be formed of a soft alloy containing a trace of calcium for enhancing the mechanical strength of the substrate.

Referring to FIGS. 3-5, plates each comprise a lead or lead alloy grid 107 that supports an electrochemically active material. Grids 107 provide an electrical contact between the positive and negative active materials or paste which serves to conduct current. Grids 107 also serve as a substrate for helping support electrochemically active material (e.g., paste) deposited or otherwise provided thereon during manufacture to form the battery plates.

As set forth in greater detail below, known arts of lead acid battery grid making include: (1) batch processes such as book mold gravity casting; and (2) continuous processes such as strip expansion, strip stamping, continuous casting, and continuous casting followed by rolling. Grids made from these processes tend to have unique features characteristic of the particular process and behave differently in lead acid batteries, especially with respect to the pasting process. It should be appreciated that grids formed from any conventional or later-developed grid manufacturing process may be utilized, and it is not the intent to limit the invention to the grid design disclosed herein.

In various embodiments, at least some of grids 107 are stamped grids. FIG. 3 illustrates an exemplary embodiment of a stamped grid 107 (e.g., a grid for a positive plate) with active material or paste provided thereon. FIG. 4 illustrates the stamped grid 107 shown in FIG. 3, but without active material. In various embodiments, stamped grid includes a frame that includes a top frame element, first and second side frame elements, and a bottom frame element. In various embodiments, the stamped grid includes a series of grid wires that define open areas that help hold the active material or paste that helps provides current generation. In various embodiments, a current collection lug 103 is integral with the top frame element. While FIGS. 3-4 depict lug 103 as offset from the center of the top frame element, the lug may alternatively be centered or positioned closer to either the first or second side frame elements. The top frame element may include an enlarged conductive section at least a portion of which is directly beneath the lug to optimize current conduction to the lug.

The bottom frame element may be formed with one or more downwardly extending feet (not shown) for spacing the remainder of the stamped grid away from the bottom of the battery container. In various embodiments, at least some of the wires of the stamped grid increase in cross-sectional area along their length from bottom to top and/or have a tapered shape so as to optimize the current carrying capacity of the wires to help carry current being generated from the bottom to the top. The width and spacing of the wires between side elements may be predetermined so that there are substantially equal potential points across the width of the stamped grid. To assist in supporting the electrochemical paste and/or permit the formation of paste pellets, in various embodiments, the stamped grid also includes horizontal wires which are equally spaced apart and are parallel to the top and/or bottom frame elements. As shown in FIG. 3-4, however, at least some of the horizontal wires may not be equally spread apart or parallel to the top and/or bottom frame elements.

Various stamped grid designs may be utilized. See, e.g., U.S. Pat. Nos. 5,582,936; 5,989,749; 6,203,948; 6,274,274; 6,921,611; and 6,953,641; and U.S. patent application Ser. Nos. 10/996,168; 11/086,525; 10/819,489; and 60/904,404, each of which are incorporated herein by reference in their entireties. It should be noted that an infinite number of grid designs may be utilized and therefore, it is not the intent of the following description to limit the invention to the grid design shown in FIGS. 3-5, which are presented for the purposes of illustration.

An exemplary embodiment of an expanded metal grid (e.g., a grid for the negative plate) is illustrated in FIG. 5. In various embodiments, the expanded metal grid has a pattern (e.g., a diamond pattern such as that shown in FIG. 5), which is well known in the art, with a bottom frame element, and a top frame element that is integral with a lug 103.

Referring to FIGS. 3-5, the cross-section of the grid wires may vary depending upon the grid making process. To help improve adhesion of the battery paste, however, in various embodiments, the grid wires may be mechanically reshaped or refinished. It should be appreciated that any number of grid wire shapes may be utilized as long as the shape provides suitable paste adhesion characteristics. For example, the cross section of wires may be of any cross-section design including substantially oval shaped, substantially rectangular, substantially diamond shape, substantially rhomboid shape, substantially hexagon shape, and/or substantially octagon shape. In the battery grid, each grid wire section may have a different cross-sectional configuration, or each grid wire section may have the same or a similar cross-sectional configuration. However, it is preferred that each grid wire section have the same cross-sectional configuration. Depending on the needs, grid 107 can be deformed at the vertical wire elements only, the horizontal wire elements only, or at both the vertical and horizontal wire elements.

The active material or paste is typically a lead-based material (e.g., PbO, $PbO_2$, Ph or $PbSO_4$ at different charge/discharge stages of the battery) that is pasted, deposited or otherwise provided onto grids 107. The paste composition may be determined by power requirements, cost, and battery environment, as it is known in the art. In various embodiments, the active material of a lead-acid battery is prepared by mixing lead oxide, sulfuric acid, and water. The lead oxide reacts with the sulfuric acid to form mono-, tri-, and/or tetra-basic lead sulfate(s). Dry additives, such as fiber and expander, may also be added to the active material. For example, in various embodiments, expanders such as finely-divided carbons (e.g., lampblack or carbon black), barium sulfate, and various lignins may be included in the active material. In various embodiments, the mixture is then dried and water is re-added to form a paste of the desired consistency.

The active material provided on a positive grid (e.g., lead dioxide [$PbO_2$]), is typically in micro-particle form, so that the electrolyte is allowed to diffuse and permeate through the lead dioxide microparticles on the positive electrode plate. The spongy lead, the active material of the negative electrode plate, is typically porous and reactive, so that the electrolyte is allowed to diffuse and permeate through the sponge lead on the negative electrode plate.

To prevent the separation of the active materials from grids 107 and to ensure easy handling of the active materials in the manufacture of electrodes, a pasting paper (not shown) may be adhered or otherwise provided on at least one of the surfaces of the active material as a support to the active material after deposition on the grids. Porous nonwoven fabric (e.g., having micron-sized pores), instead of paper, may alternatively be provided into the surface or on the active material to prevent the separation and handling problems of the active material and initial high rate discharge degradation. For example, a nonwoven fabric synthesized from thermoplastic resin by spun-bonding or thermal-bonding may be used. In various embodiments, nonwoven fabric formed of one or more polyesters, polypropylenes, or viscose rayons are used.

In various embodiments, one or more battery separators 420 are used to conductively separate the positive electrode plates 101 and negative electrode plates 102. The separator material is typically microporous to allow the through passage of ions from the positive electrode plates 101 and negative electrode plates 102. In various embodiments, separators 420 for automotive batteries are typically made in continuous lengths and rolled, subsequently folded as shown in FIG. 5, and sealed along one or more of their edges to form pouches that receive a battery plate (e.g., a negative plate as shown in FIG. 5 or a positive plate as shown in FIG. 2). However, in various embodiments, one or more separators 420 may be folded such that the ribs line the interior of the pouch that is formed to receive a battery plate.

In various embodiments, separator material generally has a substantially uniform thickness and a substantially uniform pore distribution. The pore distribution helps ensure an overall uniform current density during operation, thereby helping achieving a uniform charging and discharging of the electrodes and maximum battery efficiency. Separator 420 generally incorporates one or more ribs (e.g., as shown in FIG. 5) to help stiffen the separator 420. The ribs can have various cross-sectional shapes (e.g. rectangular, triangular, rounded, saw-tooth) or combination there.

Figure 6:
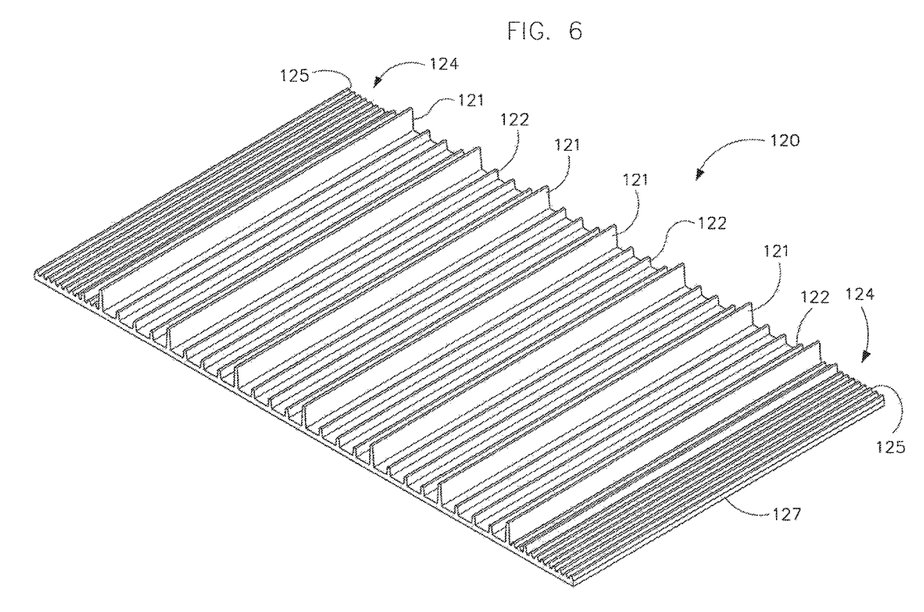
FIG. 6 is an isometric view of a separator according to a first exemplary embodiment.
Figure 7:
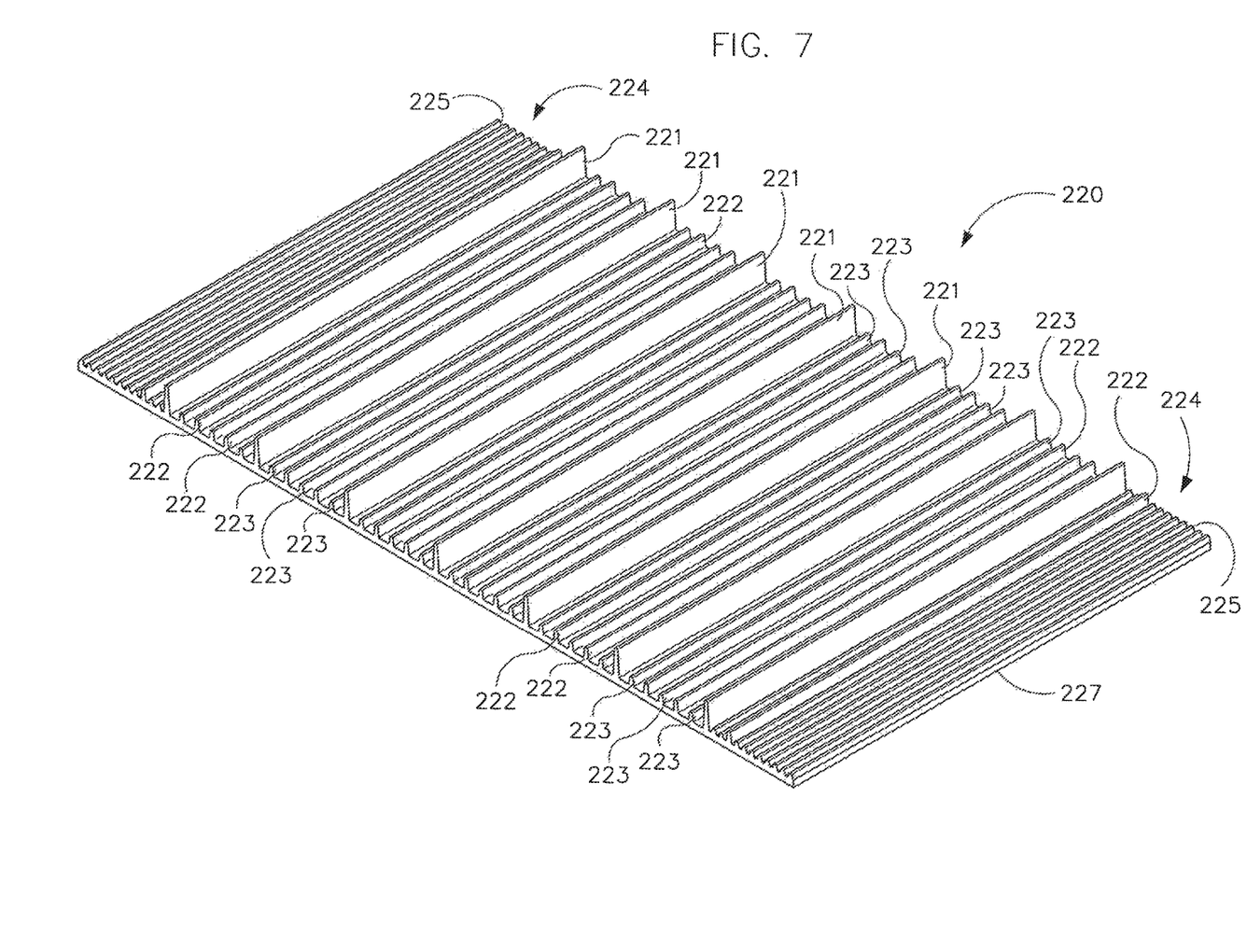
FIG. 7 is an isometric view of a separator according to a second exemplary embodiment.
Figure 8:
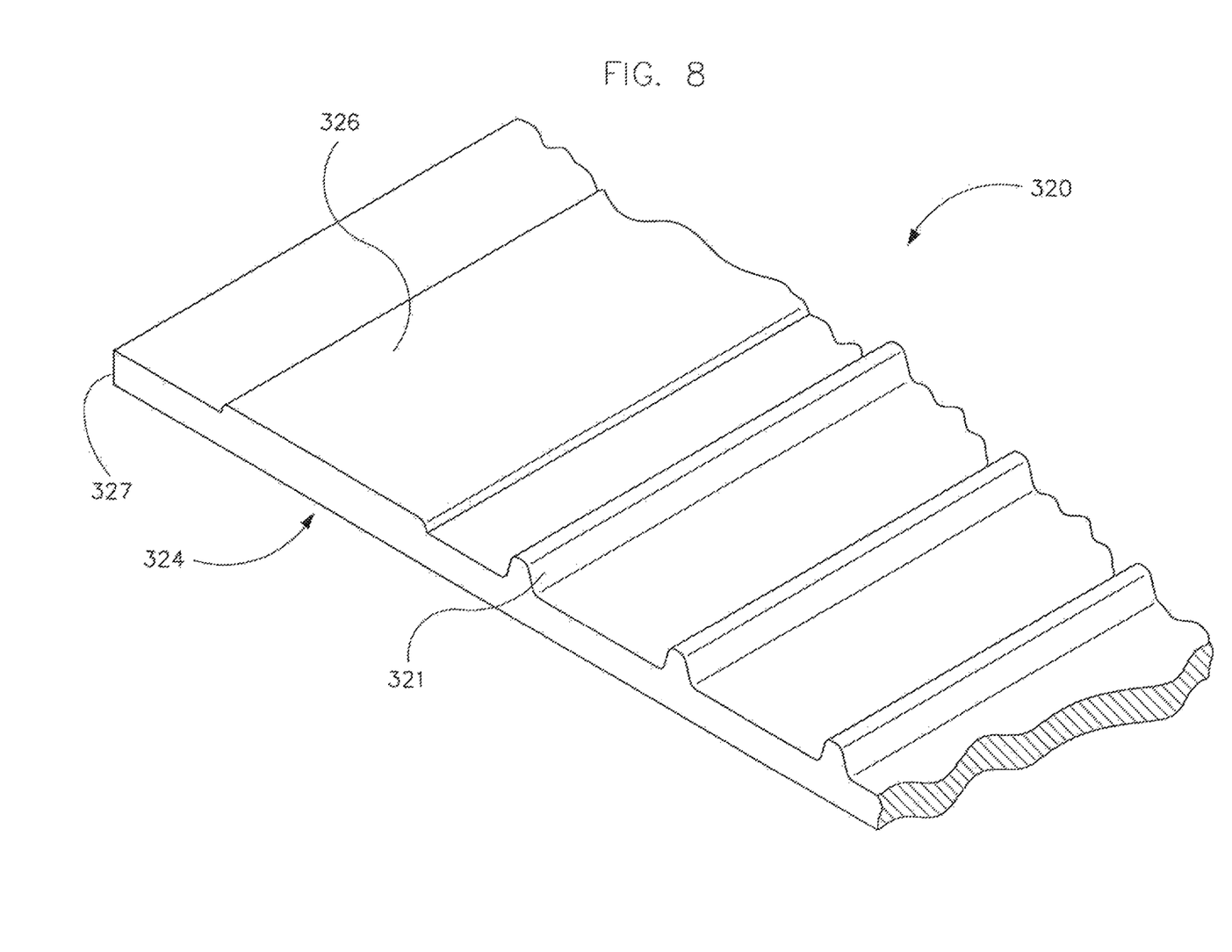
FIG. 8 is a partial isometric view of a separator according to a third exemplary embodiment.

Referring to FIGS. 6-8, for purposes of the present disclosure, references to the orientation and placement of features generally are taken from the perspective of an end view. In various embodiments, the disclosed separators generally feature one or more raised ribs that run lengthwise along the separator. A separator, according to various exemplary embodiments, has at least one raised rib and two shoulders.

In a exemplary embodiment, as illustrated by FIG. 6, separator 120 includes a number of major ribs 121 and sub-major ribs 122. Conventional ribbed separators typically include relatively smaller mini-ribs rather than sub-major ribs 122. Conventional mini-ribs are typically about 0.15 mm high (unless noted otherwise, the stated height of the various ribs is measured from the top of the separator backweb, i.e., the face of the backweb closest the distal position of the ribs or the face of the backweb on which the ribs are provided). In various exemplary embodiments, sub-major ribs 122 are about 0.45 mm to about 0.60 mm in height. The relatively taller sub-major ribs 122 function better at keeping the electrode plates away from the separator backweb than conventional mini-ribs. The various ribs are generally parallel to one another. In various embodiments major ribs 121 are about 0.60 mm to about 1.90 mm in height. The ratio of major rib height to sub-major rib height may be as high as about 4.25:1 and is greater than 1:1 (e.g., 4:3). The size of the major ribs is generally determined by the spacing required between electrode plates to accommodate the proper amount of acid and/or to fill the space in a battery compartment.

In various exemplary embodiments, the separator has an odd number of major ribs 121 (e.g., seven major ribs) and the ribs are symmetrically placed such that a single major rib divides the separator into two relatively equally-dimensioned halves. During battery manufacturing, in various exemplary processes, the separator is fed by rollers through a folding machine to form envelopes into which an electrode is placed, such as in FIG. 5. Conventional separators have a variable profile in that the spacing of major ribs and mini-ribs varies across different size separators. Separators with varying profiles can be difficult to use in battery manufacturing because they will tend to drift in the rollers to fit into grooves that form in the rollers over time because of the separators uneven surfaces. The use of a consistent profile on separators of different widths and the presence of a major rib 121 down the center of the separator (i.e., a "center rib") both improve separator tracking in the rollers and better separator and electrode plate alignment.

In various exemplary embodiments, separator 120 has three sub-major ribs 122 substantially evenly-spaced between each of major-ribs 121. In the exemplary embodiment shown in FIG. 6, separator 120 has seven major ribs 121 and six sets of three sub-major ribs 122 between each of the seven major ribs 121.

In various exemplary embodiments, as shown in FIG. 6, a separator includes a shoulder 124, i.e., the area on each side of the separator 120 between separator edge 127 and the nearest major rib. Conventional separators typically include a plurality of shoulder mini-ribs that are about 0.10 mm high. In various exemplary embodiments, separator 120 has a shoulder 124 with a plurality of enhanced shoulder mini-ribs 125 and/or at least one sub-major rib 122. In various exemplary embodiments, the shoulder mini-ribs 125 have a height greater than 0.10 mm (e.g., about 0.15 mm) and one or more sub-major ribs, having a greater height than the should mini-ribs 125.

In various embodiments, as illustrated in FIG. 7, a separator 220 includes a number of major ribs 221 (e.g., larger ribs), sub-major ribs 222 (e.g., intermediate sized ribs), and mini-ribs 223 (e.g., smaller ribs). In various exemplary embodiments, the various types are generally parallel to one another and/or evenly spaced apart at least between the shoulders. In various exemplary embodiments across different width separators, the spacing of major ribs 221, sub-major ribs 222, and mini-ribs 223 are kept identical to improve tracking during battery manufacturing. Separator 220 also preferably has an odd number of major ribs 221, which aids separator tracking. In various exemplary embodiments, sub-major ribs 122 are about 0.45 mm to about 0.60 mm in height.

In various exemplary embodiments, a separator 220 has two sub-major ribs 222 and three mini-ribs 223 between major ribs 221. In such embodiments, every other rib is a mini-rib 223. In the exemplary embodiment of FIG. 7, between the shoulders there are seven major ribs 221, twelve sub-major ribs 222, and eighteen mini-ribs 223. In various exemplary embodiments, separator shoulder 224 may include at least one sub-major rib or a mini rib or mini-rib 222, respectively, similar to sub-major rib 122 shown in FIG. 7.

In various exemplary embodiments, as shown in FIG. 7, a separator includes a shoulder 224, which is defined as the area on either side of the separator 220 between a separator edge 227 and nearest major rib 221. Conventional separators typically include a plurality of shoulder mini-ribs that are about 0.10 mm in height. In various exemplary embodiments, separator 220 has a shoulder 224 with a plurality of enhanced shoulder mini-ribs 225 and/or at least one sub-major rib 222. In various exemplary embodiments, the shoulder mini-ribs 225 have a height greater than 0.10 mm (e.g., about 0.15 mm).

Referring to FIG. 8, in various embodiments, separator 320 includes a backweb (e.g., a sheet or bracket) of dielectric material with at least one raised rib 321. In various embodiments, separator 320 also includes a shoulder 324 between rib 321 closest to an edge of separator 320 and the edge. In various embodiments, and as shown in FIG. 8, certain ribs 321 are typically substantially evenly-spaced between shoulders across width of separator 320 and run lengthwise. In various embodiments, shoulder 324 includes a raised portion 326 that is relatively thicker than other one or more portions of shoulder 324. In various embodiments, raised portion 326 is typically shorter in height and wider than any of the ribs 321.

In various embodiments, raised portion 326 does not extend to the edge of separator 320 or to nearest rib 321. Thus, in such embodiments, there is an area between the edge and raised portion 326 that is not raised or otherwise is substantially identical in thickness. The width and position of the raised portion 326 may vary depending on factors including the geometry of the electrode plates, in various exemplary embodiments, the raised portion 326 is sized and positioned so as to cover areas where punctures are most likely to occur, and perhaps without covering any additional areas.

In various embodiments, raised portion 326 is tapered at least, e.g., at one or more of its edges. For example, in various embodiments, the edge of raised portion 326 angles away of an angle to the separator 320 surface. In one exemplary embodiment, angle is about 45 degrees. In various embodiments, one or more sides of the ribs 321 are also sloped. In various embodiments, sides of the ribs 321 slope at a steeper angle than the raised portion 326. For example, in various embodiments, angle of the side of rib 321 may be seven degrees from vertical to the separator surface.

In various embodiments, the width of thickened portion 326 on shoulder 324 is less than the width of shoulder 324. A separator 120 with all of the shoulder raised (i.e., the width of the raised portion is the same or nearly the same as that of the shoulder) minimizes piercing of the separator at the shoulder, but may adversely affect cold crank performance (depending on how much of the thickened separator is over the face of the electrode plate. Moreover, in such an embodiment, the edge of the separator tends to become wavy and more difficult to roll. Thus, in the described embodiments, less than all of shoulder 324 is raised (or made thicker).

The separator may be constructed of a variety of materials (e.g., polyolefin, rubber, phenol-formaldehyde resorcinol, glass mat, microporous PVC, and sintered PVC). In various embodiments, the separator is constructed of at least in part of a microporous backweb comprised of high molecular weight polyolefin. Examples of polyolefins that may be used include polyethylene, polypropylene, polybutene, ethylene-propylene copolymers, ethylene-butene copolymers, propylene-butene copolymers, and ethylene-propylene-butene copolymers.

In various embodiments, the separator also includes at least one plasticizer. The plasticizer may be soluble or insoluble in water. Examples of plasticizers that may be used include organic esters, epoxy compounds, phosphate esters, hydrocarbon materials, and low molecular weight polymers.

In various embodiments, the separator is also constructed of an inert filler material. The filler can be soluble or insoluble in water. However, the filler may provide the primary means by which any plasticizer is absorbed and held in the composition and should not be soluble in the plasticizer. The preferred filler is dry, finely divided silica. However, other fillers (e.g., carbon black; coal dust; graphite; metal oxides and hydroxides; metal carbonates; minerals; zeolites; precipitated metal silicates; alumina silica gels; wood flour, wood fibers, and bark products; glass particles; salts such as barium sulfate; inorganic salts; acetates; sulfates; phosphates; nitrates; carbonates; and/or combinations thereof) may be utilized. It should also be understood that any known or later-developed wetting agents (e.g., sodium alkyl benzene sulfonate, sodium lauryl sulfate, dioctyl sodium sulfosuccinate, and isoctyl phenyl polyethoxy ethanol) may be utilized to enhance the wettability of the filler.

In various embodiments, the separator includes a stabilizer or an antioxidant. In various embodiments, conventional stabilizers or antioxidants such as 4,4 thiobis (6-tert-butyl-m-cresol) ("Santonox"), and 2,6-di-tert-butyl-4-methylphenol ("Ionol") may be utilized.

When separator is provided with one or more ribs, the ribs may be formed from a number of known or later-developed polymeric compositions (e.g., the same composition as the separator, other polyolefins, polyvinyl chloride, and/or filled or foamed compositions thereof). The ribs may be provided in any number of ways. For example, the ribs may be formed by extrusion (either unitarily with the backweb sheet or separately). The ribs may also be formed by grooving or embossing. When ribs are molded separately, they may be bonded or otherwise coupled to the backweb sheet or base web by any number of methods known in the art including heat sealing or by an adhesive.

The thickness of a separator will vary depending upon the type of battery in which it is used. In general, the thickness of the backweb or base web can range from 1 to 50 milli-inches ("mils"). For lead-acid batteries, the preferred thickness range is typically 10 to 40 mils. The height of each rib may vary over a wide range depending upon plate spacing requirements. Generally, ribs from 5 to 200 mils in height from the base are provided, with the preferred range being 10 to 100 mils.

Various chemistries in which the electrochemical potential between various materials is used to generate electricity have been studied and commercially implemented. See, in general: Besenhard, J. O., Ed., *Handbook of Battery Materials*, Wiley-VCH Verlag GmbH, Weinheim, Germany, 1999; and Linden, D., Ed., *Handbook of Batteries*, Second Edition, McGraw Hill Inc., New York, N.Y., 199, both of which are incorporated herein by reference.

A plate for a lead-acid battery is conventionally made by applying active material or paste to a conductive support such as a lead alloy grid. Plates can be classified according to the method of manufacturing the same. For example, one process for producing battery plates includes an initial step of melting hot lead in a furnace, followed by a step of feeding molten lead alloy to a strip caster. In the strip expansion process, a cast or wrought lead strip is typically pierced, stretched above and below the strip plane, and then pulled or expanded to form a grid with a diamond pattern. In various embodiments, the strip is coiled on a winder, and coils of lead alloy strip are stored for later use. In various embodiments, the strip may also be rolled. To form a battery grid, in various embodiments, the strip is fed through an expander that cuts, slits, and stretches a strip of coil to form the grids.

The grids may be produced using other known or later-developed processes. For example, as discussed above, the substrate may be formed by a casting process (e.g., by pouring a melted alloy into a mold), a stamping process, or by continuous rolling. During the manufacture of the grids or the plates, the grid wires may be refinished or reshaped (e.g., to improve adhesion of the paste).

The active material or paste is then applied to or otherwise provided (e.g., pasted by a conventional paster) on the expanded strip or wire grid. In various embodiments, one or more pasting materials or pasting papers are provided on one or both surfaces of the active material. In various embodiments, the pasting materials or paper may be provided in a continuous process.

In various embodiments, the grids, active material, and pasting material or paper are fed to a divider where the strip is cut into plates. Plates cut from the strip may be flattened or otherwise modified to help smooth out any uneven regions of paste. In various embodiments, the plates pass (e.g., on a conveyor) through an oven for flash-drying, and may then be stacked for later use. Conventionally, flash-drying may be performed using an open gas flame or an oven, e.g., as a 10-15 second drying of the plates in a conventional blast drying oven at about 260 deg C. (about 500 deg F.). After drying, the battery plates undergo a chemical treatment, well known to those skilled in the art. The pasted plates are next typically cured for many hours under elevated temperature and humidity to help oxidize any free lead and otherwise adjust the crystal structure of the plate.

Conventional polyolefin battery separators are typically produced by a process that comprises blending a composition of high molecular weight polyolefin, an inert filler material, and/or a plasticizer, forming the composition into sheet form, and subsequently extracting a portion of the inert filler and/or plasticizer from the backweb sheet using a solvent.

After curing, the plates are assembled into batteries. Groupings of individual battery plates may be assembled, enveloped, interleaved, or otherwise separated with separator material, and provided together to form plate sets. For example, in one common battery design, every other plate (e.g., each negative plate) in the battery set is inserted into a battery separator in the form of an envelope. The envelope acts as a separator between the plate in the envelope and the adjoining plates in the battery set. The plate sets are assembled in a container to help form a battery.

During assembly, the positive lugs of the battery plates are coupled together and the negative lugs of the battery plates are coupled together. This is typically accomplished using cast-on straps formed by taking assembled battery stacks, inverting them, and dipping the lugs into molten lead provided in a mold. To permit current to follow throughout the battery, cast-on straps of stacks are joined or coupled. Moreover, terminal electrodes are provided which extend through the cover or casing to permit electrical contact with a vehicle's electrical system or other system requiring or intended to use battery power.

In various embodiments, the battery housing 110, including the cover 111, is provided containing the battery cells. In various embodiments, the battery housing 110 is submerged in acidic electrolyte fluid in order to fill the battery housing 110 with electrolyte fluid through fill tube holes in the battery cover 111. After filling the battery housing 110 with electrolyte fluid, the battery 100 is removed from the electrolyte fluid. Any residual electrolyte fluid coating, dust, and other debris may be washed away to prepare the battery for shipment. Before washing the battery housing external surfaces, the fill tube holes may be plugged to prevent washing fluid from entering the battery housing.

In various embodiments, a single separator 120 may be folded around an electrode plate 101 or 102, such as illustrated in FIG. 5. In some exemplary embodiments, one or more aligned edges of the separator may be joined to form an envelope of separator material into which an electrode plate may be inserted and/or sealed with a tab or lug protruding therefrom. In such embodiments, one or the other of the positive electrode plates or negative electrode plates are encased in separator material with the other placed between envelopes to create a pattern similar to that exemplified by FIG. 2.

The separator may be manufactured in various known or later-developed methods (e.g., extrusion). In various embodiments, the separator is manufactured by extruding a mixture of a polymer, such as polyethylene, and an oil. After the mixture is extruded, the oil is extracted leaving micropores throughout the separator, which makes it permeable to the electrolyte solution. In various embodiments, the separator is manufactured in a continuous process and rolled into large coils for ease of storage and handling.

It is generally believed that increasing the thickness of a battery separator will decrease a battery's cold crank performance. However, that is not the case with batteries using the disclosed separator. A microporous polyethylene separator according to the embodiment of FIG. 8 was tested. The backweb of tested separator was 0.006 in. (0.15 mm) thick. The separator was 6.400 inches in width with 17 ribs running along its length. The ribs were 0.029 in. (0.74 mm) high (not including the separator backweb thickness) and about 0.015 in. (0.38 mm) wide at their peak width. The ribs were spaced about 0.313 in. (7.94 mm) apart (measured from rib centers). The separator shoulders were 0.700 in. (17.78 mm) wide (measured from the edge of the separator to the center of the nearest rib). The raised portion of the shoulder was 0.360 in. (9.14 mm) wide and 0.011 in (0.28 mm) thick (including the thickness of the separator backweb). The raised portion is located 0.120 in. (3.05 mm) from the center of the nearest rib and 0.220 in. (5.59 mm) from the edge.

Figure 9:
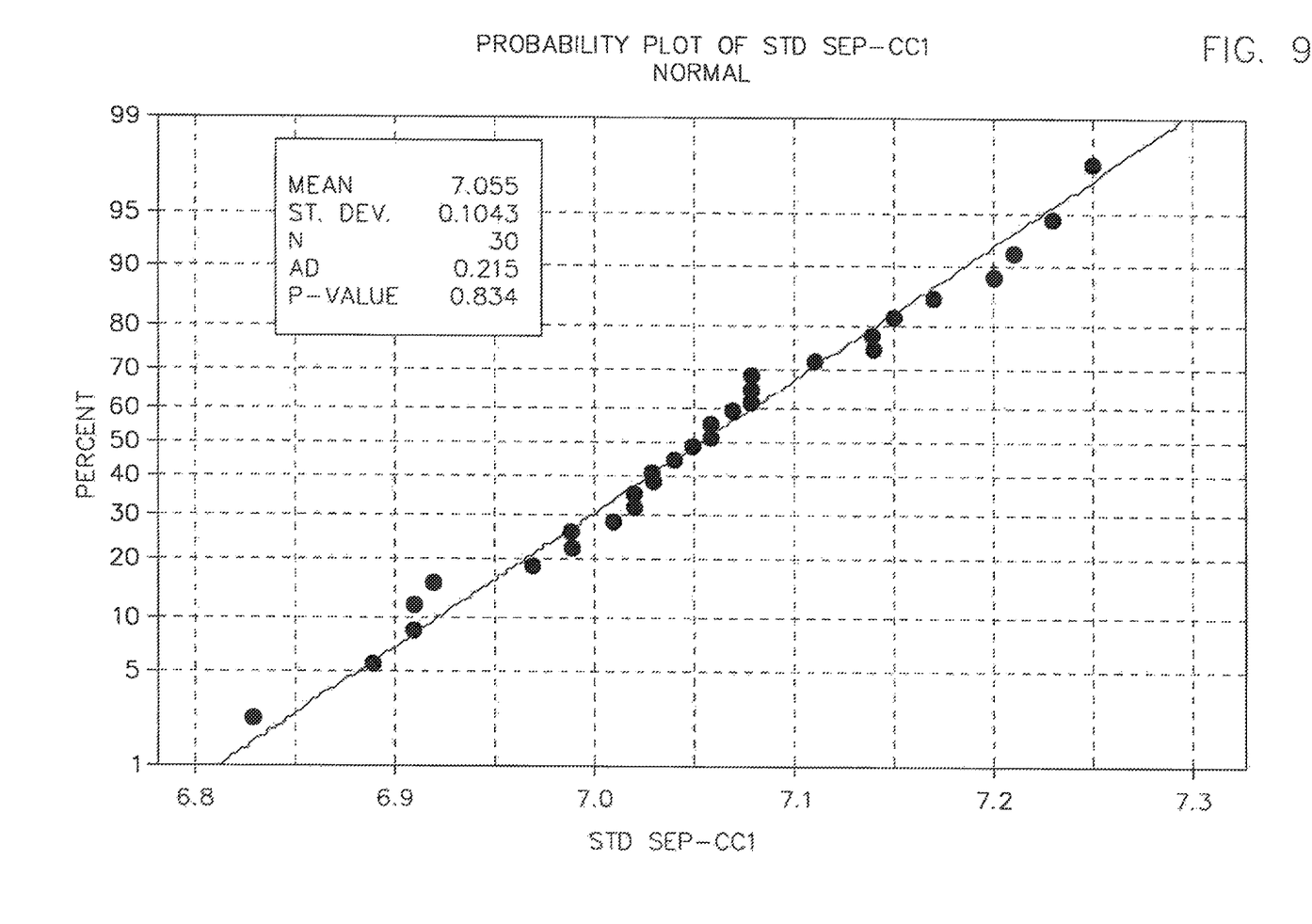
FIG. 9 is a probability plot tracking cold crank performance for a battery with standard separators.
Figure 10:
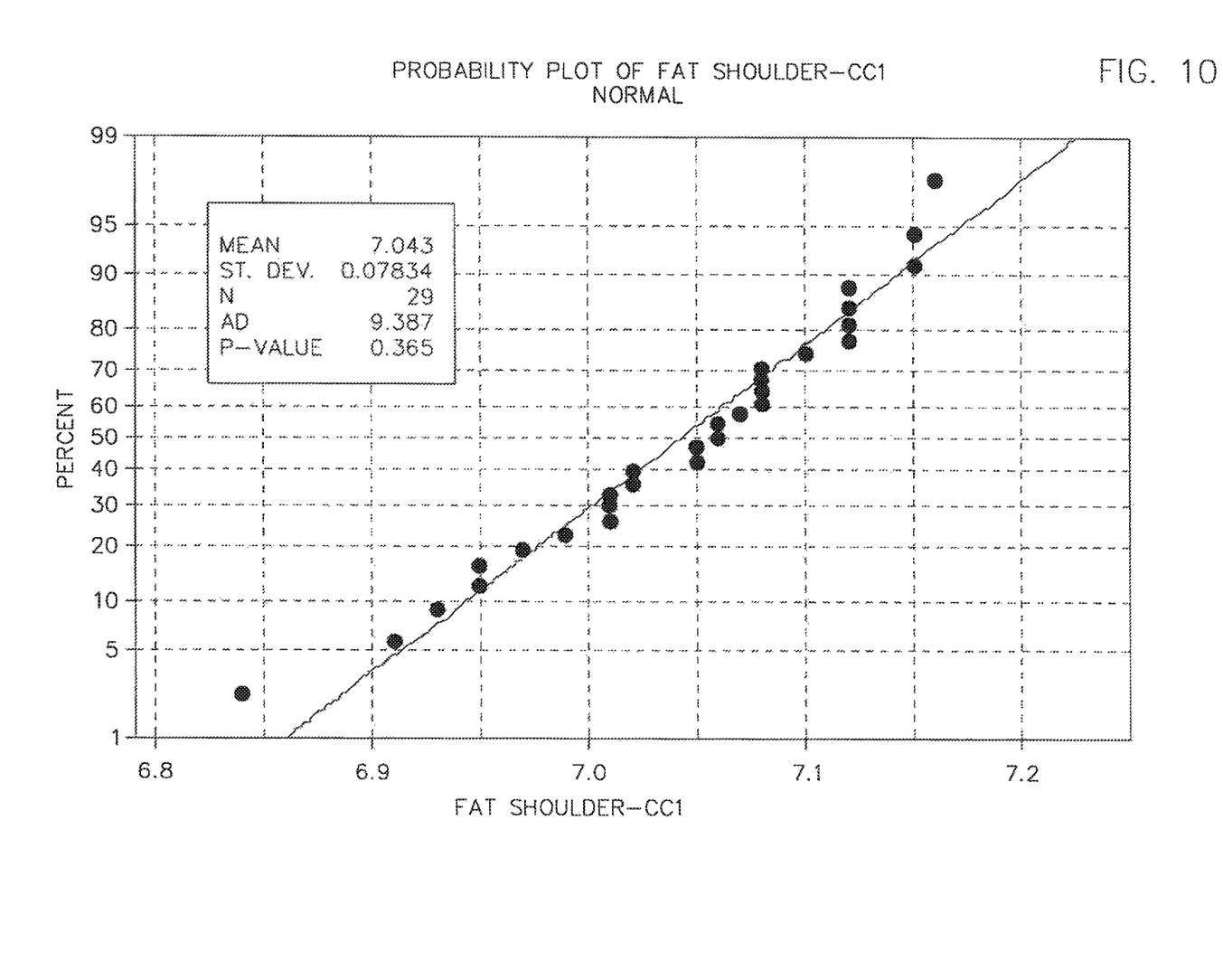
FIG. 10 is a probability plot tracking cold crank performance for a battery with a separator according to an exemplary embodiment.
Figure 11:
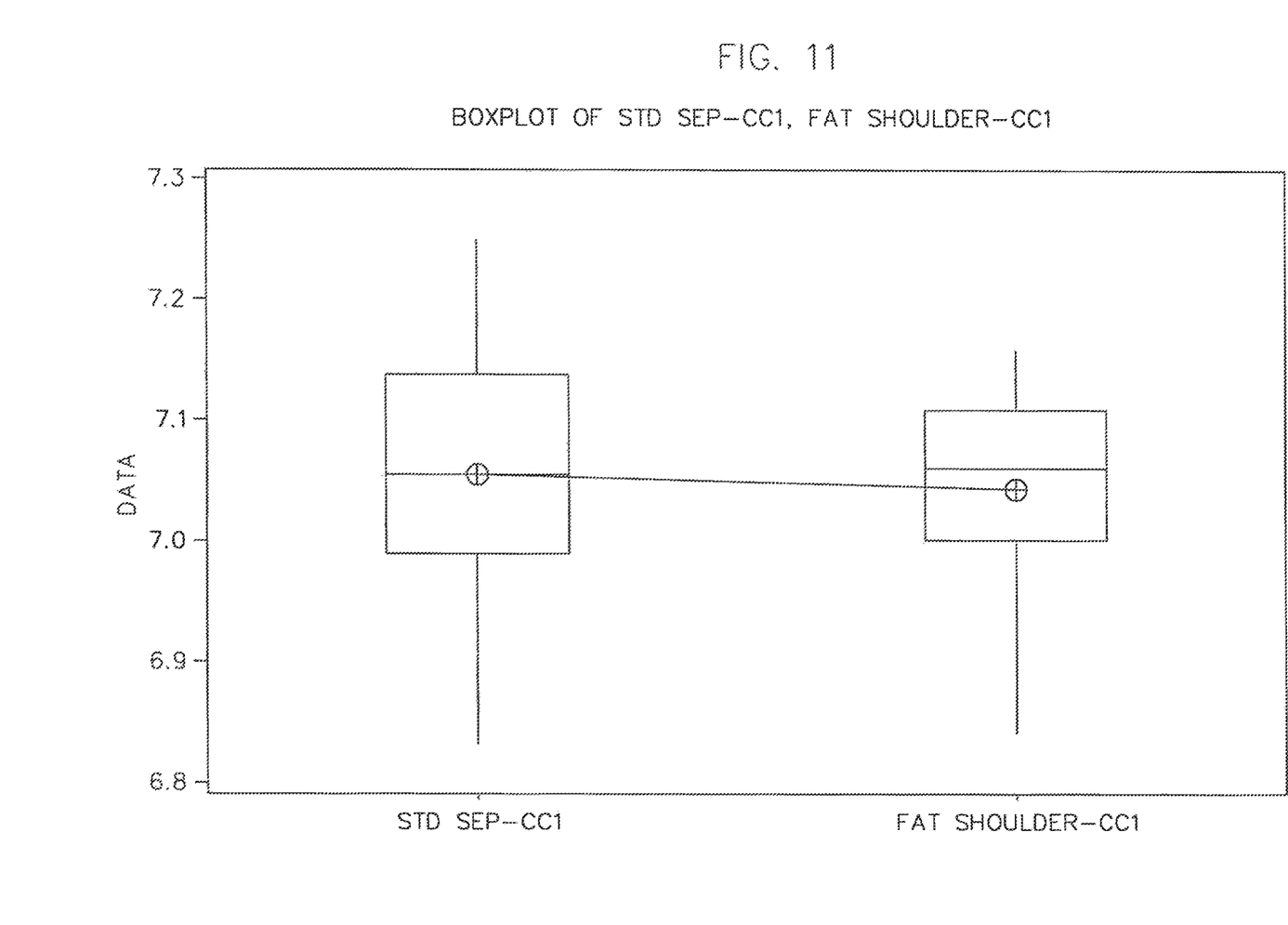
FIG. 11 is a boxplot comparing the cold crank performance of the batteries illustrated in FIGS. 9 and 10.

FIG. 9 is a probability plot tracking cold crank performance for a battery with standard separators. FIG. 10 is a probability plot tracking cold crank performance for a battery with a separator according to an exemplary embodiment. FIG. 11 is a boxplot comparing the cold crank performance of the batteries illustrated in FIGS. 9 and 10. The experimental data show that the use of the disclosed separator did not have a statistically significant impact on cold crank performance. The tests showed that the use of the separator did not have a statistically significant impact on cold crank performance.

It is also important to note that the construction and arrangement of the elements of the separator as shown in the preferred and other exemplary embodiments is illustrative only. Although only a few embodiments of the present invention have been described in detail in this disclosure, those skilled in the art who review this disclosure will readily appreciate that many modifications are possible (e.g., variations in size, dimensions, structure, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied (e.g., by variations in the number of engagement slots or size of the engagement slots or type of engagement). It should be noted that the elements and/or assemblies of the system may be constructed from any of a wide variety of colors, textures, and combinations. Accordingly, all such modifications are intended to be within the scope of the present inventions. Other substitutions, modifications, changes, or omissions may be made in the design, operating conditions, and arrangement of the preferred and other exemplary embodiments without departing from the spirit of the present invention.

What is claimed is:

1. A battery separator comprising:
   a backweb of separator material having a backweb thickness;
   an odd number of major ribs symmetrically placed such that a single major rib divides the separator into two approximately equal dimensioned halves, the major ribs projecting beyond the backweb thickness a first distance, wherein the first distance is about 0.60 mm to about 1.90 mm;
   a plurality of sub-major ribs provided between each of the major ribs and projecting beyond the backweb thickness a second distance, wherein the plurality of sub-major ribs consists of three sub-major ribs substantially evenly spaced between each of the major ribs; and
   a first shoulder area provided between a first edge of the backweb and a nearest major rib, the first shoulder area having a plurality of enhanced shoulder mini-ribs projecting beyond the backweb thickness a third distance;
   a second shoulder area provided between a second edge of the backweb and a nearest major rib, the second shoulder area having a plurality of enhanced shoulder mini-ribs projecting beyond the backweb thickness the third distance;
   wherein the first distance is greater than the second distance, the second distance is at least two times greater than the third distance, the third distance is 0.15 mm, and the major ribs and sub-major ribs are approximately evenly spaced across a same surface of the backweb.

2. The battery separator of claim 1 wherein the three sub-major ribs and major ribs are identically spaced across the backweb.

3. The battery separator of claim 1 wherein the second distance is about 0.45 mm to about 0.60 mm.

4. The battery separator of claim 1 wherein the odd number of major ribs is five or more.

5. The battery separator of claim 4 wherein there are seven major ribs.

6. The battery separator of claim 1 wherein a major rib runs down the center of the separator.

7. A battery having the separator of claim 1.

8. The battery separator of claim 1, further comprising a sub-major rib provided in the shoulder area and projecting beyond the backweb thickness a second distance.

9. The battery separator of claim 1, wherein the plurality of enhanced shoulder mini-ribs are evenly spaced along the shoulder area from the nearest major rib to the edge of the backweb.

10. The battery separator of claim 1, wherein the shoulder element includes a raised portion that projects beyond the backweb thickness, and an unraised portion that does not project beyond the backweb thickness that is provided between the raised portion and the edge of the backweb of separator material.

11. The battery separator of claim 1, wherein all ribs that are smaller than the major and sub-major ribs are approximately the same height.

12. The battery separator of claim 1, wherein all ribs provided on the separator are either major, sub-major, or enhanced shoulder mini-ribs.

13. The battery separator of claim 1, wherein the first shoulder has at least nine enhanced shoulder mini-ribs.

* * * * *

UNITED STATES PATENT AND TRADEMARK OFFICE
CERTIFICATE OF CORRECTION

| | | |
|---|---|---|
| PATENT NO. | : 9,799,871 B2 | Page 1 of 1 |
| APPLICATION NO. | : 13/003517 | |
| DATED | : October 24, 2017 | |
| INVENTOR(S) | : Pfanner et al. | |

It is certified that error appears in the above-identified patent and that said Letters Patent is hereby corrected as shown below:

On the Title Page

1. Item (75), under "Inventors", in Column 1, Line 8, delete "(NL);" and insert -- NL (MX); --, therefor.

In the Specification

2. In Column 2, Line 32, delete "embodiment; and" and insert -- embodiment; --, therefor.

3. In Column 3, Line 25, delete "sulfuric, acid." and insert -- sulfuric acid. --, therefor.

4. In Column 3, Line 38, delete "cover ill" and insert -- cover 111 --, therefor.

5. In Column 5, Line 2, delete "FIG. 3-4," and insert -- FIGS. 3-4, --, therefor.

6. In Column 5, Line 44, delete "Ph" and insert -- Pb --, therefor.

7. In Column 6, Line 49, delete "In a" and insert -- In an --, therefor.

8. In Column 7, Line 39, delete "should" and insert -- shoulder --, therefor.

9. In Column 8, Line 27, delete "plates, in" and insert -- plates. In --, therefor.

10. In Column 8, Lines 42-43, delete "thickened portion 326" and insert -- thickened portion 327 --, therefor.

11. In Column 8, Line 49, delete "plate." and insert -- plate). --, therefor.

Signed and Sealed this
Twelfth Day of June, 2018

Andrei Iancu
*Director of the United States Patent and Trademark Office*